June 24, 1930.  J. A. MARKSTRUM  1,766,136
CUTTING TOOL
Filed Nov. 28, 1924
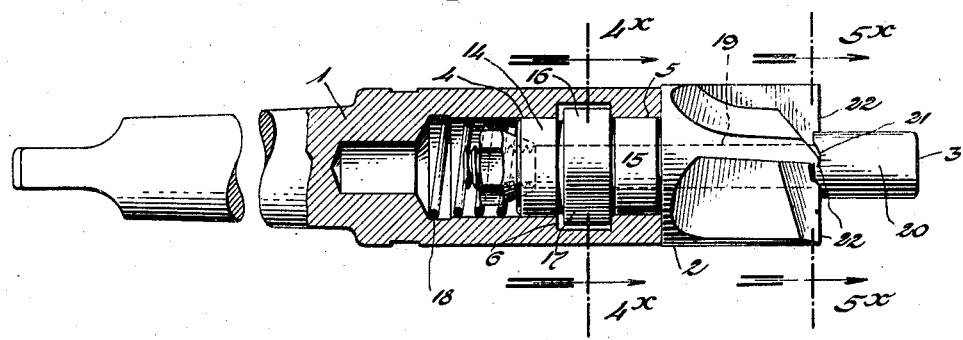
Fig.1.
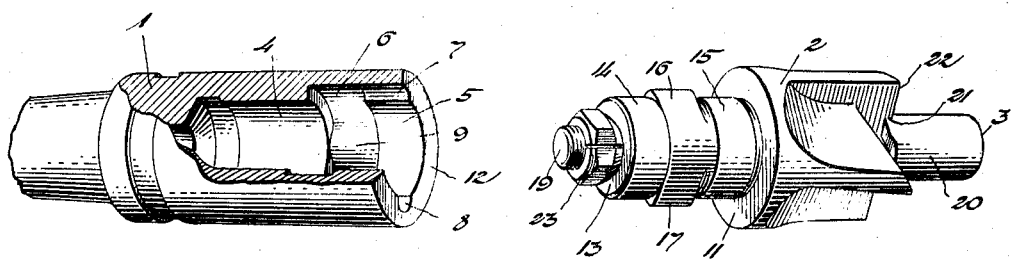
Fig.2.  Fig.3.
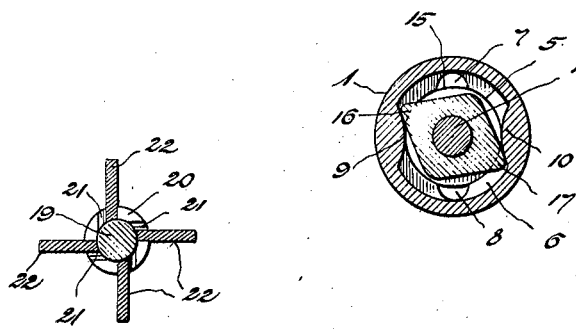
Fig.4.
Fig.5.
Inventor:
John A. Markstrum
By
Attorneys Patented June 24, 1930

1,766,136

UNITED STATES PATENT OFFICE

JOHN A. MARKSTRUM, OF DETROIT, MICHIGAN, ASSIGNOR TO CONTINENTAL TOOL WORKS, A CORPORATION OF MICHIGAN

CUTTING TOOL

Application filed November 28, 1924. Serial No. 752,702.

This invention relates to rotary cutting tools, such as drills or reamers, of the type wherein the cutting head is separable from the shank for purposes of replacement or interchangeability.

In such devices it is both necessary and desirable that substantially axial and tangential support be given to the head, as well as effective bearing for the part of the head which enters the shank, in order to ensure strength in the driving portions and rigidity in the support of the head so that it will be held in strict alinement with the shaft when in operation.

It is also desirable that the connection between the head and the shank be of a very simple and robust nature whereby the assembling and disassembling of the parts may be easily and quickly effected, and no loss of efficiency in the cutting tool sustained as a result of the detachable nature of the head.

The invention has, therefore, as its objective the provision of such a device wherein the aforesaid features are effectively incorporated; and still further to provide such a device wherein there will be no tendency of the head to jam in the shank when subjected to a high working pressure or torsional force.

A further object is to provide a form of connection which admits of the utilizing of right or left hand cutters in the same shank with equal effect; and still further objects are to eliminate the use of set screws, cotter pins, balls, plungers or similar locking means which might be liable to work loose or break and otherwise reduce the working efficiency of the device; to provide for absence of interfering parts on the outside of the shank whereby it may be threaded for stop collars or otherwise adapted for different types of collars or chucks with which the shank may be required to be used; to provide for an efficient supporting bearing of the stem of the head within the shank above and below the driving engagement of the said stem with the said shank; and to provide driving lugs in the stem of the shank extending radially beyond the bearing surfaces thereof for the purpose of ensuring great strength in the drive and freedom from weakness between the bearing portions of the said stem which might otherwise be present.

Still further objects subsidiary to or resulting from the aforesaid objects, or from the construction or operation of the invention as it may be carried into effect, will become apparent as the said invention is hereinafter further disclosed.

In carrying the said invention into effect, I may provide a rotary cutting tool having a shank adapted for insertion into any suitable chucking means, the outer end of said shank being tubular and adapted to receive the stem of a cutter head, which head shoulders against the outer end of the shank, and the stem of which is provided intermediate of its length with lugs extending radially therefrom; spaced bearing surfaces within said shank receiving and supporting the bearing portions on opposite sides of the said lugs when said stem is inserted into said shank, an annular recess being provided between the said surfaces of the shank and having slots leading thereto from the outer end of said shank through which said lugs are inserted into said recess; abutments in the said recess against which the said lugs may be rotated in either a right or left hand direction; and resilient means in said shank against the resistance of which said stem is inserted into the shank.

All of which is more particularly described and ascertained hereinafter, by way of example, having reference to the accompanying drawing, wherein Figure 1 is a broken sectional elevation of a cutting tool embodying the said invention;

Figure 2 is a broken perspective view of the socket and of the shank portion of the said cutting tool;

Figure 3 is a perspective view of the head of the cutting tool;

Figure 4 is a transverse section taken on the line 4$^x$—4$^x$ Figure 1; and

Figure 5 is a transverse section taken on the line 5$^x$—5$^x$ Figure 1.

Similar characters of reference indicate similar parts in the several figures of the drawing.

1 is the shank and 2 the head of the cutting tool, the said head in this case being provided with a pilot 3. The socket end of the said shank 1 is tubular and characterized by inner and outer bearing surfaces 4 and 5 spaced by an annular recess 6, the forward end of the said shank being also provided with internal longitudinally disposed recesses 7 and 8 giving access to the annular recess 6, which annular recess is interrupted in its continuity by stops or abutments 9 and 10 on opposite sides thereof and intermediate of the recesses 7 and 8 as is clearly indicated in Figure 4 of the drawing.

The head of the cutting tool is provided with a shoulder 11 adapted to abut against the face 12 of the shank when the head is secured to the shank and is also provided with a stem 13 which enters the said tubular shank and has longitudinally spaced cylindrical portions 14 and 15 adapted to enter the bearing surfaces 4 and 5 of the socket for the alining and supporting of the head thereon, and these cylindrical portions 14 and 15 of the stem are disposed on opposite sides of a pair of driving lugs 16 and 17 extending beyond the diameter of the portions 14 and 15 of the stem and capable of passing through the recesses 7 and 8 into the annular recess 6 of the shank. When the stem is so entered into the shank, and the lugs 16 and 17 into the annular recess 6, rotation of the head in one or other direction with respect to the shank will bring the said lugs 16 and 17 into contact with the abutments 9 and 10, or 10 and 9 respectively according to the direction of rotation, so that the said head will then be prevented from turning further in the direction in which it has been so rotated. The lugs will then be in driving engagement with the shank in a right or left hand direction according to whether the head upon attachment to the shank 1 was rotated in a left or right hand direction. The direction in which the head is rotated into engagement with the said abutments therefore simply depends upon the direction in which the tool is required to be operated. The shape of the lugs and of the abutments is such that instead of a shearing force being applied to the lugs tangential of the stem 13, a compressive driving force is exerted thereon when the tool is in use.

It will also be seen that the entrance of the lugs into the annular recess is accompanied by an entrance of the portions 14 and 15 of the stem into the bearing portions 4 and 5 of the shank, so that an efficient support of the said head is immediately secured when the lugs are rotated into contact with the abutments.

To permit of sufficient variation in the dimensions of the interlocking parts to ensure easy assembling and disassembling thereof, I may provide a spring 18 seated within the socket end of the shank against the resistance of which the stem is inserted into the shank and which ensures sufficient friction between the parts to prevent the head being rotated out of its driving position by vibration or otherwise in an undesirable manner.

This spring also has as one of its important functions an ejecting action which permits the easy removal of the stem, upon rotation, from the shank. The advantage gained in the event of the head being broken from the stem will be very apparent.

Apart from the insertion and rotation of the head, no further adjustment is necessary to effect the locking thereof in the shank and no further means within or extraneous to the shank are provided for that purpose, with the result that the exterior of the shank is free from movable parts, projections, slots or other such means as are usually associated with the shanks of rotary cutting tools having detachable heads. For this reason, any part of the exterior of the shank may be machined, threaded or otherwise equipped for reception of or attachment to any device, chuck or machine with which it may be desired to use it, without interfering with the operation or attachment of the head; and, furthermore, the bearing surfaces 4 and 5 being free from internal projections, the said shank may be utilized for the adaptation thereto of other tools such as drills, as will be readily apparent by those conversant with the art to which this invention appertains.

Support of the head when in position is secured at five points, namely, at the shoulder 11, at the portions 14 and 15, and at the lugs 16 and 17, and as these lugs 16 and 17 extend beyond the diameter of the portions 14 and 15, the strength thereof is increased and the weakness which would result in the stem were the lugs not so laterally extended is avoided.

When the head is in its driving position, the said lugs 16 and 17 effectually prevent the head from being pulled endwise from the shank as will be obvious.

The pilot 3 in this case comprises a stem 19, having an enlarged head 20 which is recessed at 21 for the reception of the teeth 22 of the cutting head, whereby rotation of the pilot with the said head is ensured due to such engagement. 23 is a split nut threaded on to the inner end of the stem 19 of the pilot and engaging the inner end of the stem 13 of the head for the securing of the said pilot to the said head.

The simple nature and robust construction of the described device is obvious and admits of quick and easy interchangeability of heads and their adequate support when in position, there being no liability of the head to become detached when in operation, or to stick and therefore become difficult of removal after operation; and the tool therefore lends itself to applicability to machine work of a very broad field, facilitating the carrying out of such work and minimizing the time required to effect the setting up and changing of tools to accomplish a series of operations.

This invention may be developed within the scope of the following claims without departing from the essential features of the said invention, and it is desired that the specification and drawing be read as merely illustrative and not in a limiting sense, except as necessitated by the prior art.

What I claim is:—

1. In a tool of the type described, a shank having a tubular socket end, a detachable head having a stem enterable into the socket end of said shank and a shoulder adapted to abut the end thereof, laterally projecting lugs on said stem, said lugs having faces approximately tangential to said stem, and abutments within said shank limiting the rotation of said head in one or other direction, said abutments being adapted to driving contact with the outer ends of said lugs, said shank being provided with recesses permitting the insertion into and rotation of said lugs within said shank.

2. In a tool of the type described, a shank having a tubular socket end, a detachable head having a stem enterable into the socket end of said shank and a shoulder adapted to abut the end thereof, laterally projecting wedge shaped lugs on said stem intermediate the length thereof, and abutments within said shank engaging the outer parts of said lugs in a plane at right angles to the longitudinal axis of said shank and limiting the rotation of said head in one or other direction by exerting a compressive force on said lugs, said head being provided with recesses permitting the insertion into and rotation of said lugs within said shank.

3. In a tool of the type described, a hollow shank having an annular recess therein and passageways thereto, a detachable head, and a stem on said head adapted to seat in said shank on either side of said recess, abutments in said recess, and laterally projecting wedge-shaped lugs equidistantly spaced around said stem adapted to pass through said passages into said recess and to engage said abutments upon rotation of said head in either direction, whereby said abutments may exert a compressive driving force thereon.

4. In a tool of the type described, a shank having a tubular socket end, and a one piece detachable head having a stem enterable into the socket end of said shank and a shoulder adapted to abut the end thereof, said stem being machined to provide integral laterally projecting lugs thereon having wide bases, said shank being also internally machined to provide integral abutments having wide bases therewithin adapted to a wedge-like engagement in one or other direction with the lugs of said shank and to exert a compressive driving force on said lugs when the tool is in use.

In testimony whereof I affix my signature.

JOHN A. MARKSTRUM.